United States Patent [19]

Korner et al.

[11] Patent Number: 4,565,297

[45] Date of Patent: Jan. 21, 1986

[54] HIGH-PRESSURE VESSEL WITH INNER CLOSURE

[75] Inventors: Jorg-Peter Korner, Hagen; Herbert Jekat, Trostberg, both of Fed. Rep. of Germany

[73] Assignee: Uhde GmbH, Dortmund, Fed. Rep. of Germany

[21] Appl. No.: 697,428

[22] Filed: Feb. 1, 1985

Related U.S. Application Data

[63] Continuation of Ser. No. 522,594, Aug. 12, 1983, abandoned.

[30] Foreign Application Priority Data

Aug. 16, 1982 [DE] Fed. Rep. of Germany ....... 3230457

[51] Int. Cl.$^4$ ................. B65D 45/00; B65D 53/02
[52] U.S. Cl. ........................... 220/254; 220/319; 220/328; 220/378; 292/256.6
[58] Field of Search ............. 220/378, 3, 319, 327, 220/328, 453, 254; 292/256, 256.6, 257, 256.71

[56] References Cited

U.S. PATENT DOCUMENTS

| | | | |
|---|---|---|---|
| 2,252,488 | 8/1941 | Bierend | 292/256 |
| 2,273,186 | 2/1942 | Fischer | 292/256.6 X |
| 2,278,882 | 4/1942 | Jacocks | 220/328 |
| 2,396,469 | 3/1946 | Meiss | 220/328 |
| 2,617,554 | 11/1952 | Smith | 220/328 |
| 2,647,656 | 8/1953 | Frisch | 220/328 |
| 2,657,823 | 11/1953 | Skinner | 220/333 |
| 2,729,491 | 1/1956 | Sieder | 220/378 X |
| 2,797,018 | 6/1957 | Worn | 220/328 |
| 2,818,995 | 1/1958 | Duguid | 220/453 |
| 2,937,782 | 5/1960 | Heimberger et al. | 220/378 |
| 3,112,842 | 12/1963 | Perl | 220/328 |
| 3,144,162 | 8/1964 | Morris | 220/378 |
| 3,279,644 | 10/1966 | Robertson | 220/378 X |
| 3,307,735 | 3/1967 | Latham | 220/328 |
| 3,339,787 | 9/1967 | Pechacek | 220/378 |
| 3,437,230 | 4/1969 | Savory | 220/327 |
| 3,522,901 | 8/1970 | Rauschenplat | 220/378 X |
| 3,695,482 | 10/1972 | Smith | 220/328 |
| 4,239,124 | 12/1980 | Inouye | 220/328 X |
| 4,347,945 | 9/1982 | Fehlau | 292/256.71 X |

FOREIGN PATENT DOCUMENTS 1433811 2/1966 France ........................... 292/256

*Primary Examiner*—Allan N. Shoap
*Attorney, Agent, or Firm*—Fraser & Clemens

[57] ABSTRACT

The present invention relates to a high-pressure vessel with inner closure suitable for frequent load changes due to charging and discharging, comprising a forged cylindrical shell with bulbed ends and at least one cover with a frustum-shaped top surface, the cover being centered by supporting elements of the same shape and inclination and being tightened by the prevailing inner pressure. Further features of this high-pressure vessel are the cover bottom sealing which is locally separated from the supporting segments and is radially movable by means of a retaining ring as well as a thin-walled liner with welded-on wearing ring. In view of the frequent opening and closing actions, it is advisable to provide the vessel cover with a small feed-hold cover which is tightened by the prevailing inner pressure and which may be used whenever permitted by the process material characteristics.

7 Claims, 4 Drawing Figures

HIGH-PRESSURE VESSEL WITH INNER CLOSURE

This application is a continuation of Ser. No. 522,594 filed Aug. 12, 1983, now abandoned.

BACKGROUND OF THE INVENTION

The invention relates to a high-pressure vessel with inner closure which is especially suitable for frequent opening and closing for the purpose of filling and emptying the vessel.

Modern process technology is unimaginable without high-pressure vessels. For instance, synthesis or polymerization processes require high-volume pressure vessels having been designed for pressures of 500 bar and more. However, such pressure vessels as used for ammonia synthesis or ethylene polymerization are normally in operation for longer periods, i.e., several months or years, and at the same pressure load. Major pressure variations are mainly to be expected during start-up and shutdown of such high-pressure plants.

As the cylindrical shell of a pressure vessel represents the greatest material portion, numerous designs aimed at optimizing the quantity of material required have been developed.

A summary of such designs is given by H. Strohmeier in Rheinstahl Technik, 9th year of publication, Volume 3/71, page 104 and following, and by J. Ehle and A. Pollanz in Chemikerzeitung, 95th year of publication (1971), No. 1, page 28 and following.

The closure of high-pressure vessels is of special importance. Depending upon the application, a high-pressure vessel is equipped with two removable closures or with one removable and one welded-on or forged-on bottom. While the so-called outer closures, the cover of which rests on the pressure vessel flange and is fixed by stud bolts or clamps, can only be used for high-pressure vessels of small diameters, the closure becoming otherwise too heavy and inoperable and thus too expensive with regard to fabrication and mounting, the inner closures have a wide range of application.

VDI-Z. 104 (1962) No. 11, page 479, refers to an inner closure for a high-pressure vessel which consists of a cover, a tapered sealing ring, several segments of a supporting ring, bolts for fastening the segments, and a retaining ring. The vessel closure is designed so that the vessel is pressed against the tapered sealing ring which, on the one hand, is supported by the vessel shell and which, on the other hand, diverts the axially-acting force components via the horizontal supporting ring faces into the vessel flange. The integration of the tapered sealing ring into the force flux of the cover supporting system causes high taper area loads involving the risk of damage or welding. In order to obtain the full effect on the sealing face, the surface finish must be extremely high. Before subjecting the vessel to the inner pressure load, a prestress is applied to the tapered sealing ring by means of the cover tensioning bolts and the retaining ring so that the closure is already tight when the inner pressure is built up. However, this type of inner closure is inappropriate for frequent closing and opening because the manual operation of the covers is extremely time consuming.

SUMMARY OF THE INVENTION

The object of the present invention is to create a pressure vessel with the self-sealing inner closure meeting the special requirements without producing the disadvantages of the structures known.

According to the present invention, the high-pressure vessel is designed to produce the features outlined in the characterizing part of the principal claim.

To obtain further advantages, the high-pressure vessel design is based on the features outlined in the characterizing part of the sub-claims.

The advantages obtainable with the high-pressure vessel designed according to the present invention are that plastic deformations on the supporting faces are no more encountered due to the local separation of the supporting and sealing faces. Consequently, no material welding will occur any more. The component parts of the closure can simply and rapidly be disassembled. Thereby, short opening and closing times are reached for batch-type operation of high-pressure plants.

The seal is only exposed to the inner pressure and is not charged with load peaks, e.g., resultants from a parallelogram of forces.

The angle of the frustum-shaped faces depends upon the prevailing maximum inner pressure and the inner closure diameter.

For high-pressure vessels with large inside diameters implying increased ovalization with heavy covers involving reduced sensitiveness during mounting and demounting of the closure, the wear of the seal can be reduced according to a further embodiment of the present invention by the seal set in place at the bottom of the cover for unobstructed radial movement by using a retaining ring. Even if the cover is not absolutely in the central position, the seal with its sealing elements is automatically centered as against the vessel inner bore.

If high-pressure vessels of the type described are used for food or for extremely aggressive substances, the vessels have to be provided with a liner consisting, for instance, of alloy steel. It has proved to be particularly expedient and advantageous to pull a thin-walled liner with ample loose fit into the completed high-pressure vessel, the liner being joined by a wearing ring in the area of the seal to be inserted at a later date. Contrary to the liner which is generally rolled from a thin-walled sheet metal and longitudinally welded, the wearing ring is turned part with a far less loose fit and less ovalization. The inside surface of the wearing ring is of high quality so that the sealing rings may easily slide on them. The bevel on the wearing ring allows a perfect welding to the thin-walled liner without causing any detrimental superheating of the vessel material in the weld area.

The locking element keeping the supporting elements in place may be of any suitable design. Thus, it is, for instance, possible to design this locking element as a split ring not being susceptible to be jammed on the upper inner part of the cover or to provide the locking element in the form of several segmental elements. This would prevent jamming of the locking element(s) on the cover.

Should it be feasible to charge or to discharge the high-pressure vessel temporarily through an opening of a smaller inside diameter than the vessel diameter, the cover might be equipped with a feed-hold with cover opening towards the inside and being automatically tightened by the inner pressure of the high-pressure vessel.

BRIEF DESCRIPTION OF THE DRAWINGS

Typical embodiments of the present invention are shown in the accompanying drawings, in which.

DETAILED DESCRIPTION OF THE PREFERRED EMBODIMENTS OF THE INVENTION

Figure 1:
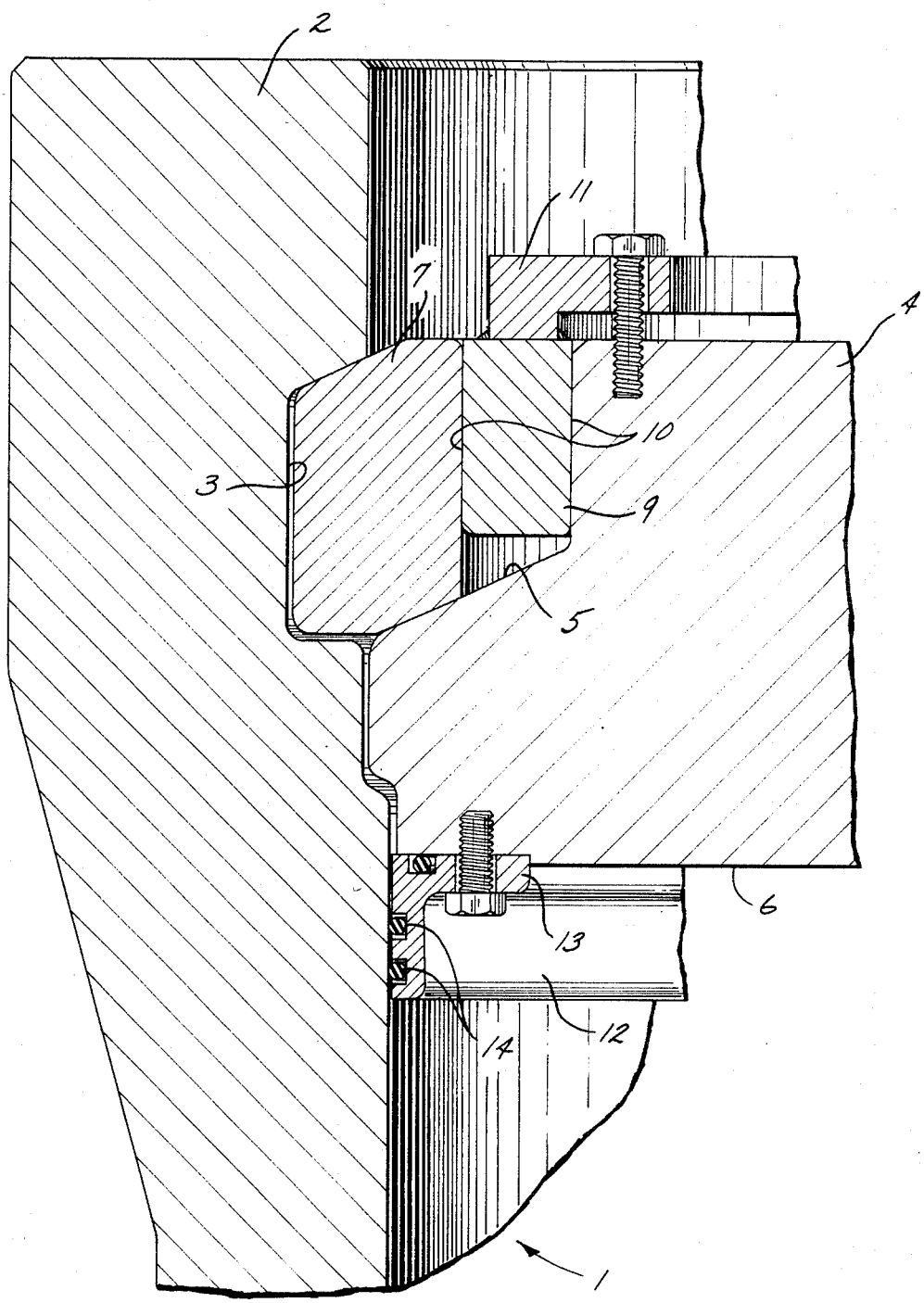
FIG. 1 is a a fragmentary sectional view of a high-pressure vessel with an inner closure and L-shaped seal, embodying the features of the present, at operating pressure.

The high-pressure vessel 1 of FIG. 1 consisting preferably of a forged cylindrical shell without any welds in the pressure-bearing parts and being suitable for frequent load changes is equipped on the upper end with a bulbed flange 2 provided with the recess 3. This recess 3 is inclined towards the vessel end by an angle of 15° to 45°, preferably 25°. The cover 4 is particularly characterized by the outer upper surface having a frustum-shaped face 5 with an inclination of 15° to 45°, preferably 25°. The operating pressure of e.g. 300 bar acting upon the cover bottom 6 causes the cover 4 to be pressed against the supporting segments 7 designed to form a multipart ring. The supporting segments 7 show the same angle of about 25° on the supporting surfaces facing the frustum-shaped face 5 of the cover 4 and the recess 3 of the vessel. In this way the sealing force emanating from the cover is immediately directed via these supporting segments into the bulbed flange thus excluding any essential transverse force components. The locking element 9 consisting of a single-part split ring or of several segmental elements provides with its contact surfaces 10 on the cover 4 and on the supporting elements 7 for a correct positioning of the cover 4 and of the supporting segments 7 and prevents that in case of any transverse forces acting on the supporting segments, the latter will slide up towards the vessel axis. Due to the inclined faces provided for on the supporting segments 7, the transverse forces will never reach values at which plastic deformation or welding may occur on the contact surfaces 10. For better handling, several locking elements 9 will be kept in place by means of a retaining ring 11. However, this ring has no force-absorbing function.

Tightening of the cover 4 against the high-pressure vessel 1 in case of inner pressure build-up is effected by the seal 12 installed at a cover bottom. The seal consists of the sealing ring 13 provided with the sealing elements 14 inserted in grooves, e.g. O rings made from a special material or spring-supported sealing elements. The sealing ring 13 is inserted at the cover bottom 6 in the manner generally known. The action of the sealing ring is such that in case of an inner pressure build-up, the gap between the seal and cover or shell is reduced by expansion of the sealing ring so that the sealing ring is sitting perfectly close to the cover bottom and to the vessel shell. The inserted sealing element 14 cannot be pressed out through the gaps. The closure is thus absolutely tight.

Figure 2:
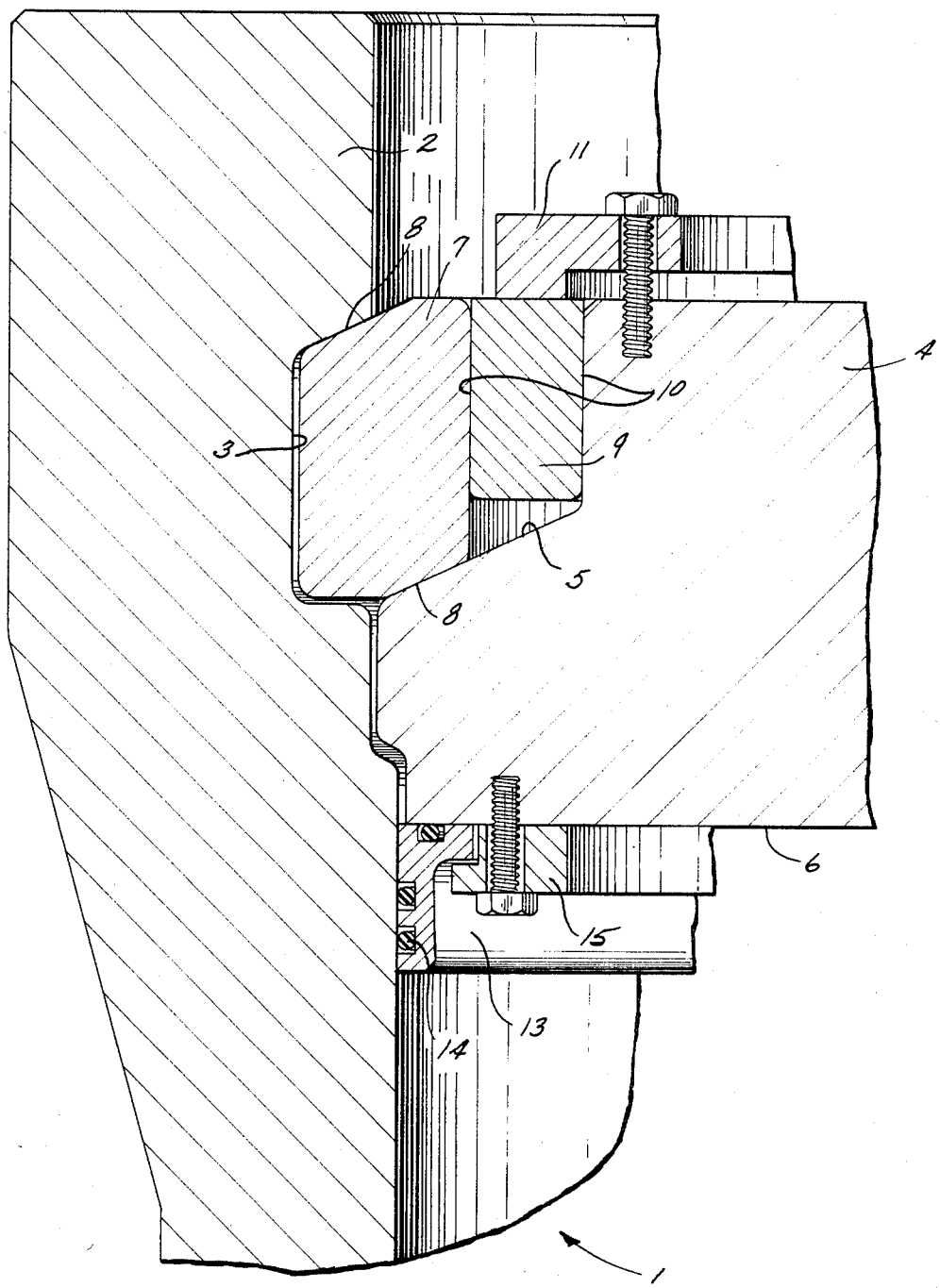
FIG. 2 is a fragmentary sectional view of a high-pressure vessel with an inner closure similar to the embodiment illustrated in FIG. 1 showing a radially movable L-shaped seal at operating pressure.

A further embodiment of this invention is shown in FIG. 2. In order to compensate fabrication tolerances and to reduce the wear of the seal during assembly and disassembly, the sealing 13 is set in place at the cover bottom 6 for unobstructed movement. The retaining ring 15 has been designed on its outside so that the sealing ring 13 shows radially as well as axially, a clearance and is thus freely movable. Thereby fabrication tolerances permitting a certain ovalization of the vessel and/or cover as well as centering inaccuracies due to double the frustum-shaped faces 5 and supporting faces 8 are compensated in a simple manner. Especially for large cover diameters, the movable sealing ring 13 allows greater fabrication tolerances for the vessel shell and cover and guarantees an absolute tightness of the inner space during pressure build-up because the sealing ring sits perfectly close on the shell and cover of the pressure vessel even at relatively low pressures, the gap between the shell or cover and the sealing ring thus approaching zero.

Figure 3:
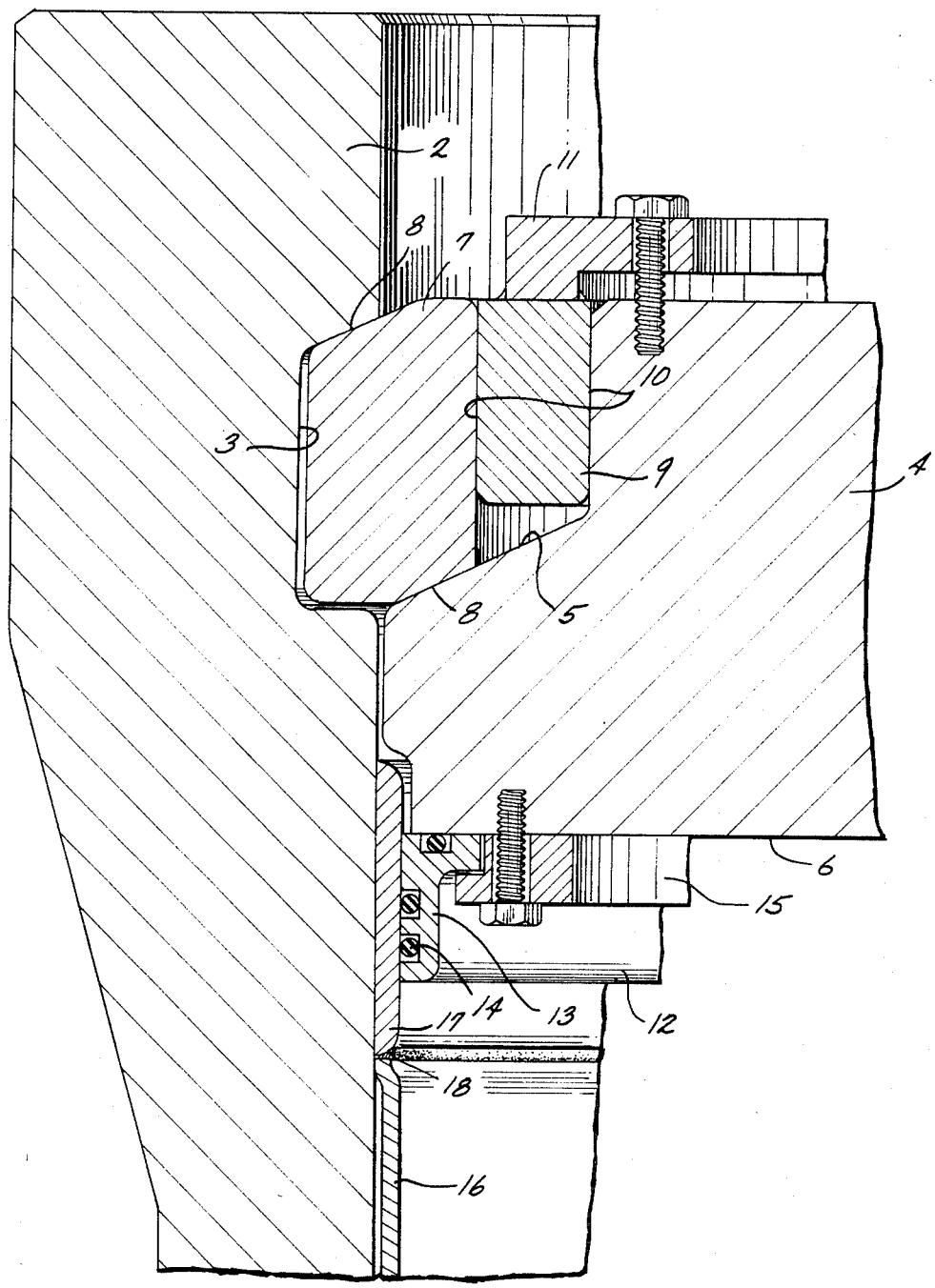
FIG. 3 is a fragmentary sectional view of a high-pressure vessel with an inner closure similar to the embodiments illustrated in FIGS. 1 and 2 showing a pulled-in liner and welded-on wearing ring, prior to the first pressure load.
Figure 4:
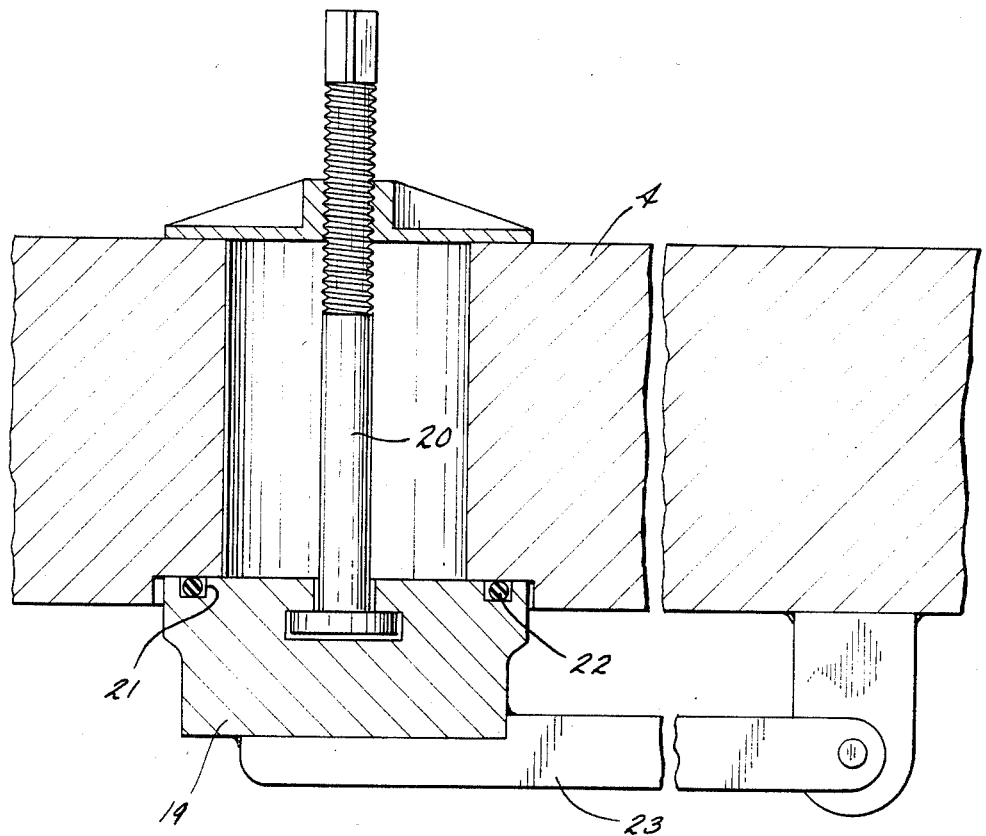
FIG. 4 is a fragmentary sectional view of a cover of the inner closure with feed-hole cover at operating pressure.

High-pressure vessels intended for processing food or aggressive substances are equipped according to FIG. 3, with an inner liner consisting of a special metal. For optimum economy this liner 16 e.g. made from chrome, nickel or steel, and is preferably prefabricated by plate material rolling and welding. Due to ovalization, the liner must be undersized by about 3 to 5 mm referred to the inside diameter of the high-pressure vessel, the undersize providing for a clearance between the vessel shell and the inserted liner. Safe tightening of the sealing ring 13 is achieved by welding a wearing ring 17 with its bevel 18 to the liner. The wearing ring is inserted nearly clearance-free and its inner bore is of high surface quality. During the first pressure build-up in the high-pressure vessel, the thin-walled liner is expanded so as to contact the inside surface of the vessel shell. The roundness and the quality of the inner surface of the wearing ring 17 guarantees the sealing function of the sealing ring.

Should the sealing effect decrease due to the many opening and closing actions, either the wearing ring 17 or the sealing ring 13 may be replaced at low cost and within a short time.

The number of the opening and closing actions of the inner closure required for batch-type operation can be reduced by charging and discharging the substances to be processed through an opening of a smaller diameter than the inside diameter of the high-pressure vessel. The smaller feed-hold cover 19 is pulled by a screwed stem 20 from the bottom towards the cover 4 of the high-pressure vessel, tightening being effected by the sealing element 22, e.g. an O ring, or a spring-supported sealing element inserted in the groove 21. The cover 19 is connected to the main cover by a pivoting or shifting lever 23.

The bottom of the high-pressure vessel may, if it is not forged on the shell, be closed by a cover of the same design. Instead of the small feed-hole cover, other devices may be provided for charging and discharging liquids or solids.

The high-pressure vessel as per this invention is of unlimited usability. It preferably serves the purpose of discontinuous extraction of vegetable substances by means of supercritical gases.

What is claimed is:

1. A high-pressure vessel with an inner closure, the closure comprising:
   a. a cover having an upwardly facing frustum-shaped surface;
   b. a plurality of supporting segments defining a multiple part ring adapted to be received within a recess formed in the inner surface of the high-pressure vessel and having downwardly facing frustum-shaped surfaces contacting the upwardly facing frustum-shaped surface of said cover;
   c. locking means mounted on said cover for maintaining said supporting segments within said recess formed in the inner surface of the high-pressure vessel; and
   d. a seal disposed at the bottom of said cover for sealingly engaging the inner surface of the high-pressure vessel and the bottom of said cover.

2. The invention defined in claim 1 wherein the angle of the frustum-shaped surfaces lies in a range of 15 degrees to 45 degrees.

3. The invention defined in claim 1 or 2 including a retaining ring secured to the bottom of said cover coupling said seal thereto for permitting limited radial movement of said seal.

4. The invention defined in claim 1 including a thin-wall liner positioned within the high-pressure vessel and provided with a wearing ring at the upper end thereof, said wearing ring having an outer annular surface contacting the inner surface of the high-pressure vessel in the area of said seal and having an inner annular surface sealingly engaging said seal.

5. The invention defined in claimed 1 wherein said locking means comprises a split ring.

6. The invention defined in claim 1 wherein said cover is provided with an opening and includes a feedhold cover pivotly mounted on the bottom of said cover and opening towards the inside of the high-pressure vessel.

7. A high-pressure vessel with an inner closure, the closure comprising:
   a. a cover having an upwardly facing frustum-shaped surface;
   b. a plurality of supporting segments defining a multiple part ring adapted to be received within a recess formed in the inner surface of the high-pressure vessel each segment having a downwardly facing frustum-shaped surface contacting the upwardly facing frustum-shaped surface of said cover, each segment also having an upwardly facing frustum-shaped surface adapted to contact a downwardly facing frustum-shaped surface formed in said recess of the high-pressure vessel;
   c. locking means mounted on said cover for maintaining said supporting segments within said recess formed in the inner surface of the high-pressure vessel; and
   d. a seal disposed at the bottom of said cover for sealingly engaging the inner surface of the high-pressure vessel and the bottom of said cover.

* * * * *